United States Patent [19]
Toji

[11] Patent Number: 5,260,736
[45] Date of Patent: Nov. 9, 1993

[54] AUTO FOCUS CONTROL DEVICE
[75] Inventor: Shigeo Toji, Tokyo, Japan
[73] Assignee: Fuji Photo Film Co., Ltd., Kanagawa, Japan
[21] Appl. No.: 941,379
[22] Filed: Sep. 4, 1992
[30] Foreign Application Priority Data
  Sep. 4, 1991 [JP] Japan .................... 3-224443
[51] Int. Cl.$^5$ ............................. G03B 13/36
[52] U.S. Cl. ..................... 354/402; 358/227
[58] Field of Search .......... 354/402; 358/227
[56] References Cited
U.S. PATENT DOCUMENTS

| 4,383,274 | 5/1983 | Inuiya .................... 358/227 |
| 4,833,541 | 5/1989 | Takuma et al. ........... 358/227 |
| 4,967,280 | 10/1990 | Takuma ................... 358/227 |
| 5,150,217 | 9/1992 | Senuma et al. ........... 354/402 X |

Primary Examiner—W. B. Perkey

[57] ABSTRACT

A broad band pass filter and a narrow band pass filter are provided. The broad band pass filter detects a moving direction of the focus lens certainly and a peak of the evaluative value rapidly. And then, the band pass filter means is switched to the narrow band pass filter. The narrow band pass filter confirms whether a detected peak is correct or not. It is compared with a brightness when the evaluative value is peak and a brightness at a moment mhe the evaluative value is not peak, for example, an evaluative value is minimum. If a difference of brightness becomes large, it is not recognized as a peak and a peak detection is repeated. A gain value of the amplifier is reduced corresponding to a linear-, step- or curve characteristicline between a focus position of the focus lens and a focus distance of the zooming lens when a gain value of the automatic gain control (AGC) circuit is relatively high, so that a noise component in a high frequency part is reduced. In the case that an iris is relatively closed, a gain of the AGC is relatively high or a gain of the amplifier circuit is relatively high, a noise component becomes large so that the reference value becomes high in order to judge a peak of an evaluative value certainly. On the other hand, in the case that the iris is relatively opened, a gain value of the automatic gain control circuit is relatively low or a gain value of the amplifier circuit is relatively low, a noise component becomes low in order to detect a peak rapidly without a focus lens running over a focus point.

7 Claims, 13 Drawing Sheets

AUTO FOCUS CONTROL DEVICE

BACKGROUND OF THE INVENTION

The present invention relates to a control device of an auto-focus mechanism equipped in a camera and an improvement of focusing certainly and rapidly.

In the case that a zone for measuring a distance between an object and a camera is provided at a picture plane of the camera in an auto-focus mechanism in a type of a contrast method, a fixed and small zone is conventionally provided at a center portion of the picture plane. Usually, it is photographed a main object positioned at a center portion of the picture plane, so that a lens member is actuated in order to optimize a contrast ratio of a picture at the center portion of the picture plane.

However, when it takes a picture against the light, generally a contrast ratio is remarkably reduced at a center portion of the picture. It becaomes difficult to find an optimum contrast in the case of a conventional zone for measurng a distance and its focusing would become wrong.

In the case of an auto-focus mechanism in a type of a high frequency detecting method which is one of the contrast methods, an output of a picture image passes through an automatic gain control (AGC) circuit, a high frequency part of a signal of a picture image obtained from the automatic gain control circuit (hereinafter, it is referred as "a high frequency part") is picked up by passing a band pass filter, a picked-up high frequency part is detected in order to detect an evaluative value for focusig (hereinafter, it is referred as "an evaluative value"), and a proper focus position of a lens member where the evauative value becomes peak is determined. That is, when focusing is proper, a contrast ratio becomes maximum and a high frequency part also becomes maximum. In such cases, one kind of a band pass filter is utilized. Usually, a circuit for amplifing by a fixed gain value is provided at a wave detecter circuit in order to incearse a sensitivity for picking up the high frequency part. In addition, it is judged whether a peak is over when the evaluative value is going down after the evaluative value is going up. However, a noise is usually included in the evaluative value. Unless the evaluative value changed more than a noise level, it cannot be found that the evaluative value is actually increased or decreased. Therfore, in a conventional method, it is judged whether a displacement of an evaluative value is greater or less than a fixed reference value.

However, in a conventional auto-focus mechanism, there is only one band pass filter. In the case of a narrow band pass filter, if a focus lens is initially positioned far from a proper focus point, a filter output is little changed although the focus lens is moved frontwards or backwards. Since a high frequency part shifted to a relatively low frequency part and an amplitude of the signal is still small. Accordingly, the evaluative value is little changed initially so that it is very difficult to detect whether a frontward direction or a backward direction is a proper direction toward a focus point. It needs much time to detect a peak of the evaluative value certainly. In the case of a broad band pass filter, a displacement of the evaluative value is changed slightly near the peak, so that it is difficult to detect a real peak certainly.

The above described relation between focusing and an amount of a high frequency part comes into existence in the case that a brightness of an object is constant. If a brightness of an object is changed while a focus lens is moving for detecting a peak of an evaluative value, a wrong evaluative value is recognized as a peak. Since, a high frequency part is changed in accordance with a displacement of a brightness.

In the case that an object is dark. an iris is further opened and a gain value of AGC circuit becomes high. The high gain value of AGC is added to a fixed gain value of an amplifier circuit. Then, a gain value in a whole system becomes very high and a noise component is also increased. If the noise component is large, it is difficult to detect a change of the evaluative value although the evaluative value is increased or decreased a little. A peak of an evaluative value is unclear so that it cannot detect a proper focus position certainly. Further, a noise level is changed in accordabce with an opening degree of an iris, a gain value of AGC citcuit and a gain value of an amplifier in a wave detector. It is a problem described as follows, if a reference value for detecting a displacement of an evaluative value is fixed.

(1) In the case of a fixed reference value as a relatively low level, when an iris is relatively closed, a gain of AGC is relatively high or a fixed gain of an amplifier is relatively high, a noise is increased in the evaluative value. A judgement of a peak of the evaluative value becomes unclear due to the noise. As a result, the judgement are sometimes wrong.

(2) On the contrary, in the case of a fixed reference value as a relatively high level, when an iris is relatively opened, a gain value of AGC is relatively low or a fixed gain of an amplifier is relatively low, a peak of the evaluative value cannot be judged until the evaluative value is much decreased, although a noise is relatively less. That is, the peak cannot be deteced until a focus lens runs over a proper focus position some distance. A detection of the peak is delayed.

On the other hand, recently, there is a video camera in a rear focus lens type, in which a focus lens is provided behind a zooming lens. In the rear focus lens type, a proper focus position of a focus lens is changed depending on a focusing distance of a zooming lens. The focus position is changed as a curved line.

Conventionally, it is difficult to successively change a position of a focus lens in accordance with a focus distance of a zooming lens.

A purpose of the present invention is to resolve the above descrived problems, particularly, the first purpose of the present invention is to provide an auto focus control device in an auto focus mechanism in a type of a contrast method by detecting a high frequency part to judge a proper direction of a focus lens toward a focus position and a peak of an evaluative value.

The second purpose of the present invention is to provide an auto focus control device in an auto focus mechanism in a type of a contrast method by detecting a high frequency part to prevent from wrong focusing by detecting an evaluative value at a right focusing timming and positioning a focus lens at a point where the evaluative value becomes maximum.

The third purpose of the invention is to provide an auto focus control device in an auto focus mechanism in a type of a contrast method by detecting a high frequency part to focus a dark object correctly in a case that an evaluative value is detected and a focus lens is positioned at a point where the evaluative value becomes maximum.

The fourth purpose of the present invention is to provide an auto focus control device in an auto focus mechanism in a type of a contrast method by detecting a high frequency part to judge a peak of an evaluative value correctly without mistaking in the case that a focus lens is positioned at a point where the evaluative value becomes peak.

SUMMARY OF THE INVENTION

To accomplish the first purpose, the present invention is characterized in that an auto focus control device comprises a broad band pass filter and a narrow band pass filter as a band pass filter means, and a means for judging a moving direction of a focus lens and a peak of an evaluative value determined from an output of the broad band pass filter, switching the band pass filter means from the broad band pass filter to the narrow band pass filter and finding a peak of the evaluative value. The peak of the evaluative value is recognized when the evaluative value is stable for a few moment while a focus lens moves frontwards and backwards.

To accomplish the second purpose, the present invention is characterized in that an auto focus control device comprises a means for detecting a brightness of an object, a means for comparing a brightness of an object when an evaluative value becomes peak and a brightness of the object at the other time, and a means for judging a detected peak of an evaluative value as valuable when a difference of the compared values is within a reference level and the detected peak of the evaluative value as invaluable when the difference of the compared values is over the reference level.

To accomplish the third purpose, the present invention is characterized in that an auto focus control device comprises a detecting means for detecting a high frequency part of a signal passed through an automatic gain control circuit and means for reducing a gain value of the detecting means in accordance with a gain value of the automatic gain control circuit.

To accomplish the fourth purpose, the present invention is characterized in that an auto focus control device comprises a means for changing a reference value in order to judge whether a displacement of an evaluative value is valuable or invaluable in accordance with an opening degree of an iris, a gain value of an automatic gain control circuit or a gain value of an amplifier ciecuit.

With respect to the first purpose, a broad band pass filter and a narrow band pass filter are provided. The broad band pass filter detects a moving direction of the focus lens certainly and a peak of the evaluative value rapidly. And then, the band pass filter means is switched to the narrow band pass filter. The narrow band pass filter confirms whether a detected peak is correct or not.

With respect to the second purpose, it is compared with a brightness when the evaluative value is peak and a brightness at a moment mhe the evaluative value is not peak, for example, an evaluative value is minimum. If a difference of brightness becomes large, it is not recognized as a peak and a peak detection is repeated.

With repect to the third purpose, a gain value of the amplifier is reduced corresponding to a linear-, step- or curve characteristicline between a focus position of the focus lens and a focus distance of the zooming lens when a gain value of the automatic gain control (AGC) circuit is relatively high, so that a noise component in a high frequency part is reduced.

With respect to the fourth purpose, in the case that an iris is relatively closed, a gain of the AGC is relatively high or a gain of the amplifier circuit is relatively high, a noise component becomes large so that the reference value becomes high in order to judge a peak of an evaluative value certainly. On the other hand, in the case that the iris is relatively opened, a gain value of the automatic gain control circuit is relatively low or a gain value of the amplifier circuit is relatively low, a noise component becomes low in order to detect a peak rapidly without a focus lens running over a focus point.

DETAILED DESCRIPTION OF THE PREFERRED EMBODIMENTS

Figure 1:
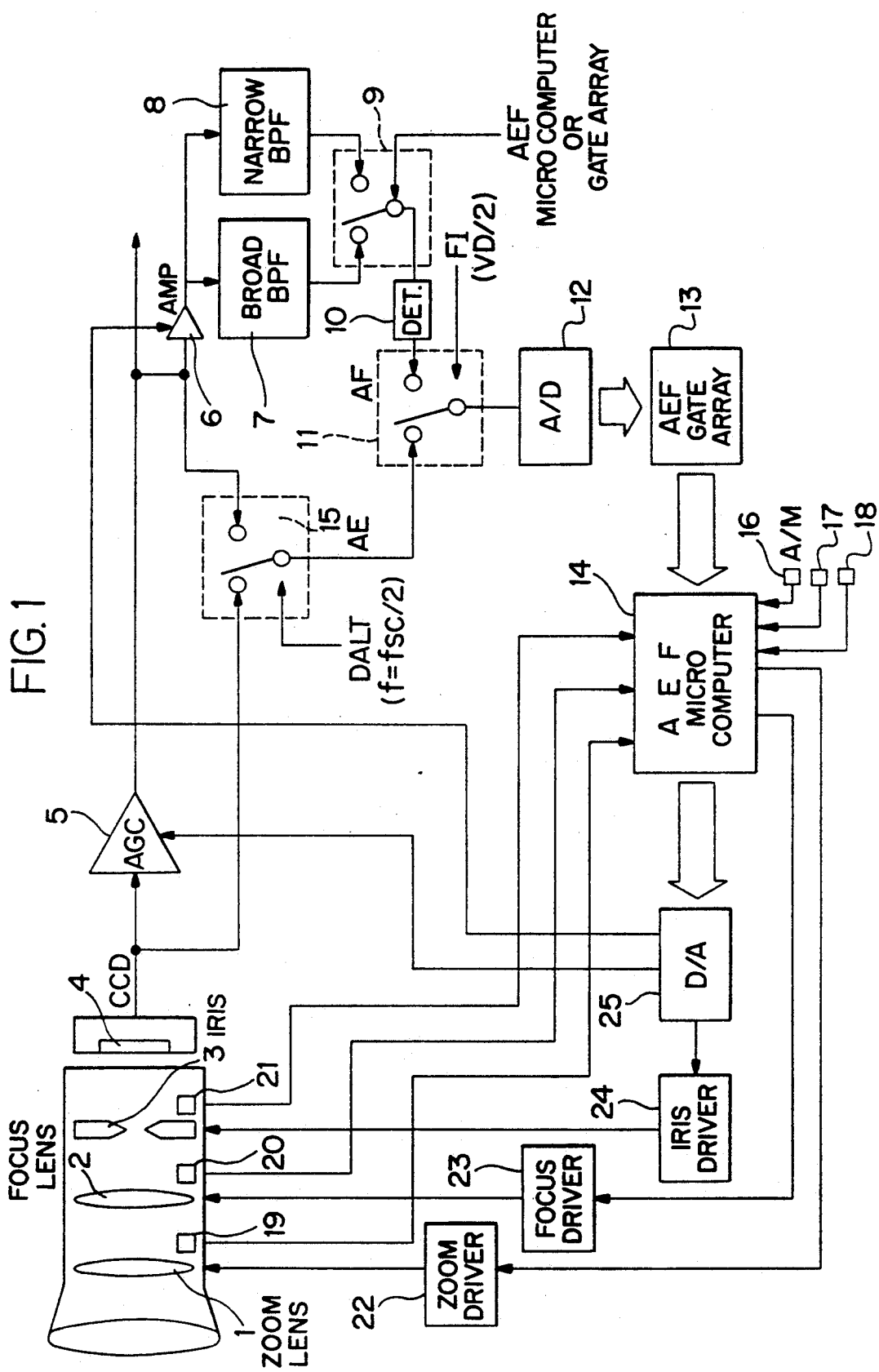
FIG. 1 shows a block diagram of a video camera with an auto focus control device according to the present invention.

One of the embodiments according to the present invention will be descrived with reference to FIG. 1 through FIG. 18. FIG. 1 shows a block diagram of a video camera according to the present invention. The video camera employs an auto focus mechanism in a type of a cotrast method by detecting a high frequency part. Controls of auto focus and auto exposure are operated by a common micro computer. Further, the video camera employs a rear focus method in which a focus lens is positioned behind a zooming lens as an optical mechanism.

In FIG. 1, a picture image of an object formed by a zooming lens 1 and a focus lens 2 is input to a picture plane of a charge coupled device (CCD) 4 through an iris 3. A signal of a picture image is input from the CCD 4 to an amplifier circuit 6 through an automatic gain control circuit 5. An amplified output from the amplifier 6 is input to a broad band pass filter 7 and a narrow band pass filter 8. One of the signals from the bandpass filters 7 and 8 is selected by a switch 9 and input to a wave detector circuit 10. An output of the detector 10 is input to an analogue/digital (A/D) converter 12 by a swich 11 when FI information is "0". A digital output signal of the A/D converter 12 is integrated for low frequency filtering by an integration gate array 13 and then an evaluative value showing a focus degree in an auto focus system is input from the integration gate array 13 to a micro computor 14. The larger a high frequency part of the output signal of the CCD 4 becomes, the greater the evaluative value becomes. The output signal of the CCD 4 and the output signal of the AGC circuit 5 are alternatively selected by a swich 15 with $f_{sc}/2$. When FI signal is "1", the output signal is input to the A/D converter 12 by the swich 11. The digital output signal of the A/D converter 12 is integrated by the gate array 13 and then its output signal is input to the micro computor 14 as an evaluative value regarding brightness in an auto focus system. The swtich 9 is actuated in accordance with commands from the computor 14. The switch 11 is actuated in accordance with FI signal which is alternatively changed "1" and "0" with VD/2. An A/M switch 16 for switching an auto focus position and a manual position, a zoom switch 17 for actuating an electric zoom member, a volume operating member 18 in a manual focusing period, an encoder 19 for detecting a position of the zooming lens 1, a sensor 20 for detecting a home posotion of the focus lens 2 and a hole element 21 for detecting an opening degree (iris value) of the iris 3 are connected to the computor 14 and the outputs are input to the computor 14 for auto focus and auto exposure. The computor 14 provides a cotrol signal to a driving means 22 for driving the zooming lens 1 and a driving means 23 for driving the focus lens 2 and a drivng means 24 for driving the iris 3, respectively, so that the position of the focus lens 2 and the iris 3 can be controlled. In addition, gain control signals are provided to the AGC circuit 5 and the amplifier 6 to control a gain value thereof. A numeral 25 means a digital/analogue (D/A) converter.

An operation of the micro computor 14 will be described in detail with reference to FIG. 2 through FIG. 18.

Figure 2:
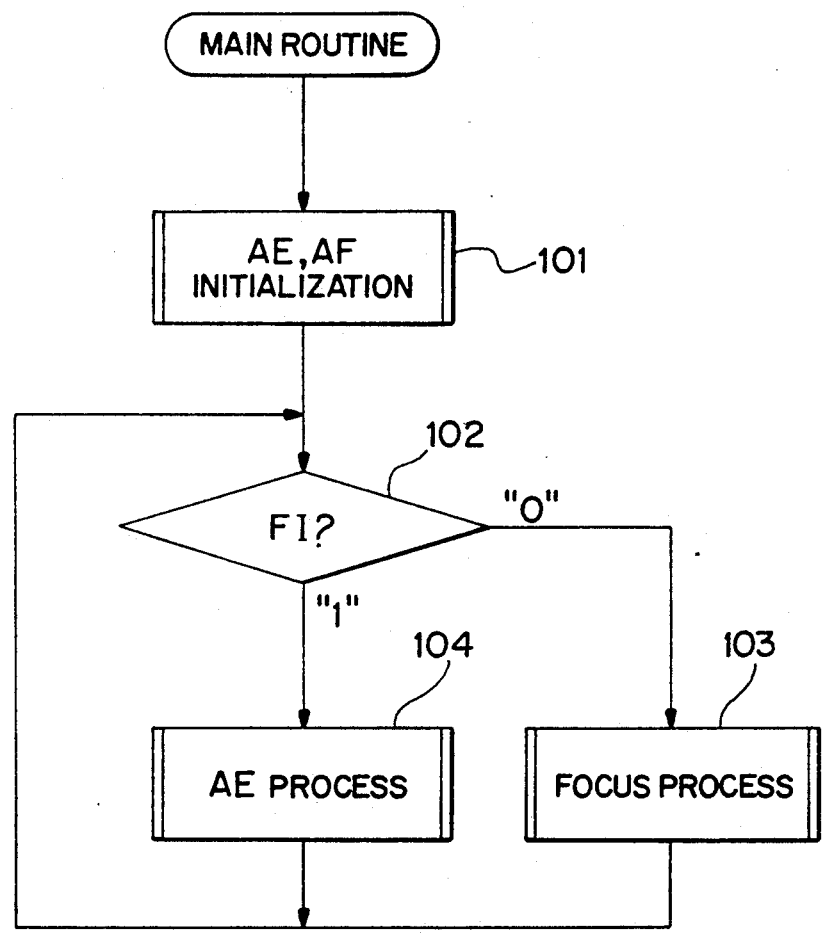
FIG. 2 shows a flow chart of a main routine.

FIG. 2 shows a main routine of the computor 14. After the computor 14 is switched on, an auto focus system and an auto exposure system are initialized in a step 101. A FI signal of the switch 11 is judged "1" or "0" in a step 102. If the FI signal is "0", an auto focus process, a manual focus process, and a zooming process of the both processes are operated in a step 103. If the FI sigal is "1", a counter light judgement by a multi-devided light measurement, a spot light judgement are operated as an auto exposure process. The iris 3 and the AGC circuit 5 are together controlled in a step 104. These control values and input data can be always referred in a focus routine (see FIG. 3) in the same computor 14.

Figure 3:
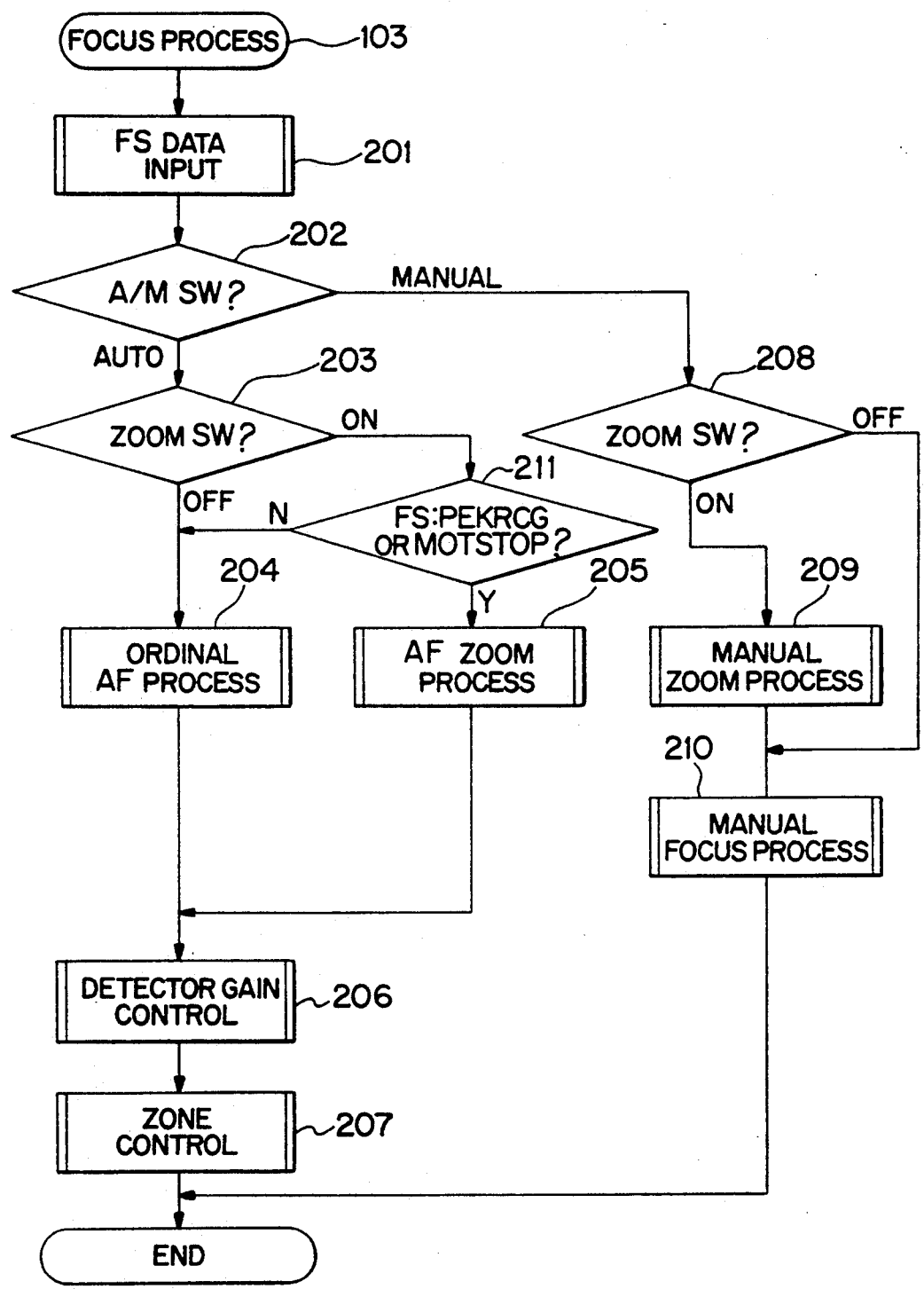
FIG. 3 shows a flow chart of a focus processing routine.

The focus process in the step 103 is operated along a routine as shown in FIG. 3. In step 201, the computot 14 receives an evaluative value of focus degree beased on the output of the wave detector 10 as a focus data from the integral gate array 13. In the next, A/M switch 16 judges whether a present mode is an automatic mode or a manual mode in a step 202. If the automatic mode is selected, it is judged whether a zoom switch 17 is OFF or ON in a step 203. If the zoom switch 17 is ON, it means that a status of the zoom switch 17 is ON in a telescope mode and a wide mode. If the zoom switch is OFF, an ordinal auto focus process (see FIG. 4) is operated in a step 204. Further, if the zoom switch is ON, it is necessary to operate a zoom process. In the case that a focus status data FS is recognized as REKRCG or MOTSTOP at a step 211, an auto focus zoom process is operated in a step 205 (see FIG. 11). After finishing an ordinal auto focus prpcess or an auto focus zoom process, a wave detector gain control process (see FIG. 8) and a process for controlling a zone for measuring a distance are operated in order in steps 206 and 207. If an A/M switch 16 is shifted to the manual mode in the previous step 202, it is judged whether the zoom switch 17 is ON or OFF in a step 208. If the switch 17 is recognized ON, a manual zoom process (see FIG. 14) is operated in a step 209 and then a manual focus process (see FIG. 15) is operated in a step 210. If the zoom switch 17 is recognized OFF, the manual focus process is immediately operated 210.

Figure 4:
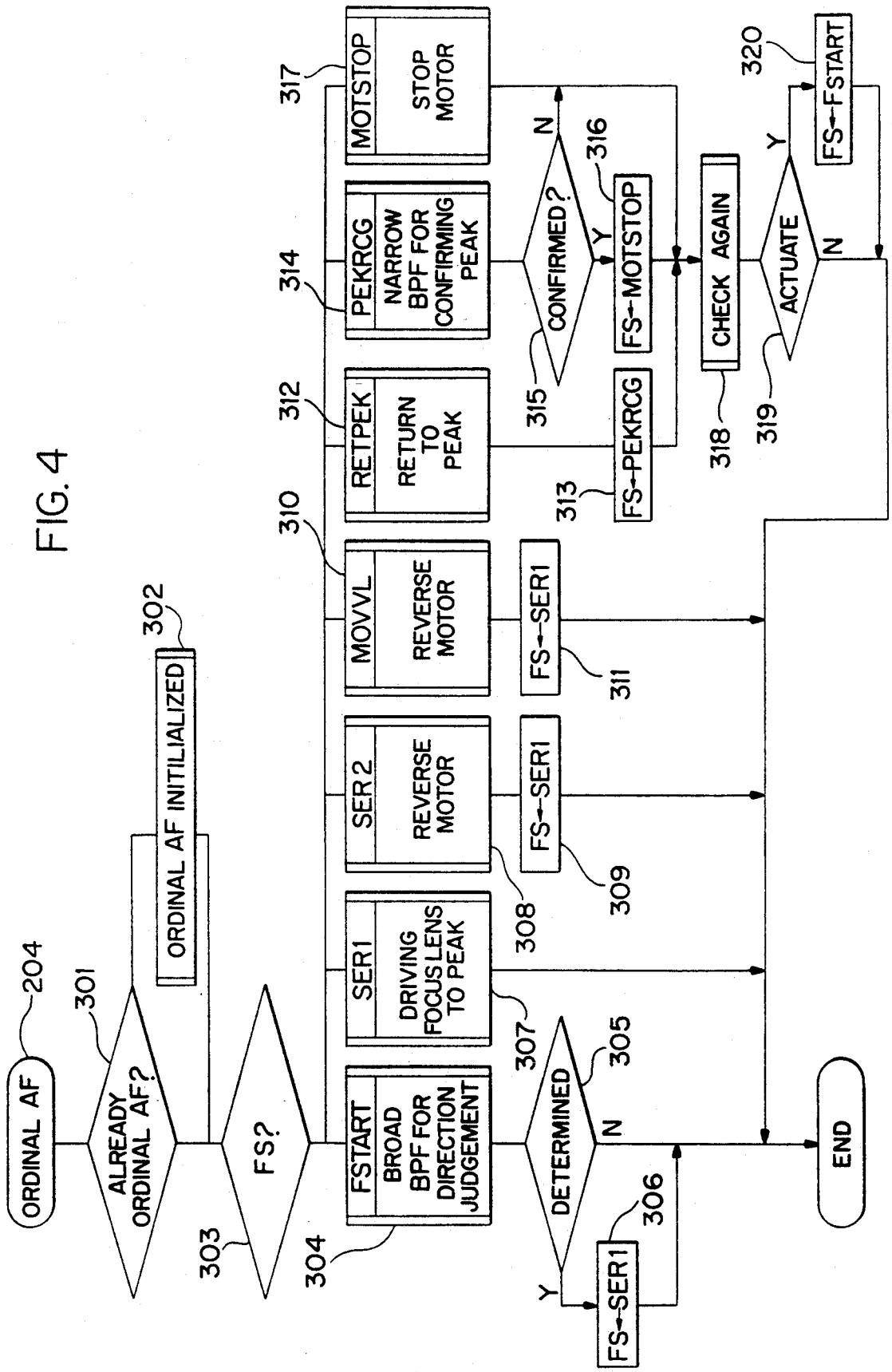
FIG. 4 shows a flow chart of an ordinal auto focus processing routine.

The ordinal auto focus process routine will be described with reference to FIG. 4 through FIG. 7. As shown in FIG. 4, it is judged whether the last process is an ordial auto focus process or not at the first step 301. If it is judged NO, the ordinal auto focus process is inintialized in a step 302. After a focus status FS information is set FSTART, the focus status information is judged in a step 303. There are other six kinds of the focus status, that is, SER1, SER2, MOVVL, RETPEK, PEKRCG, and MOTSTOP. The auto focus process is operated depending on the focus status information.

In the case of FSTART, the micro computor 14 controls the switch 9, selects an output of the broad band pass filter 7, actuates the focus lens 2 by the driver means 23 and judges a moving direction of the focus lens 2 for focusing. If the evaluative value is increased in accordance with a movement of the focus lens 2, the moving direction is a proper direction for focusing. On the contrary, if the evaluative value is decreased, an opposite direction is a proper direction for focusing. If the evaluative value does not change, a proper direction for focusing is unclear. If a moving direction of the focus lens 2 is determined in a step 305, a focus status information is rewritten to SER1 in a step 306 and an operation returns to the step 303.

Figure 5:
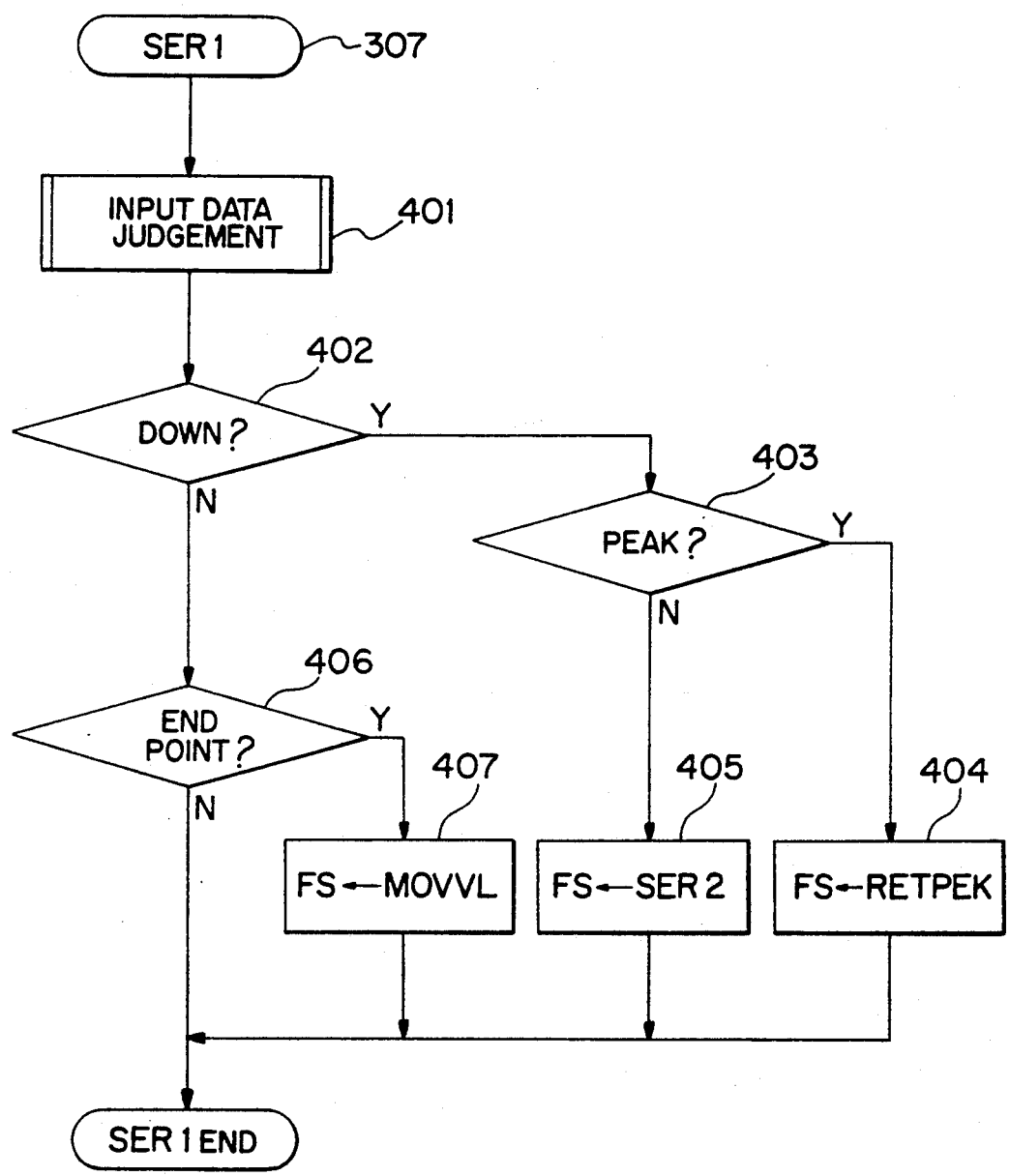
FIG. 5 show a flow chart of SER1 routine for detecting a peak of an evaluative value.
Figure 6:
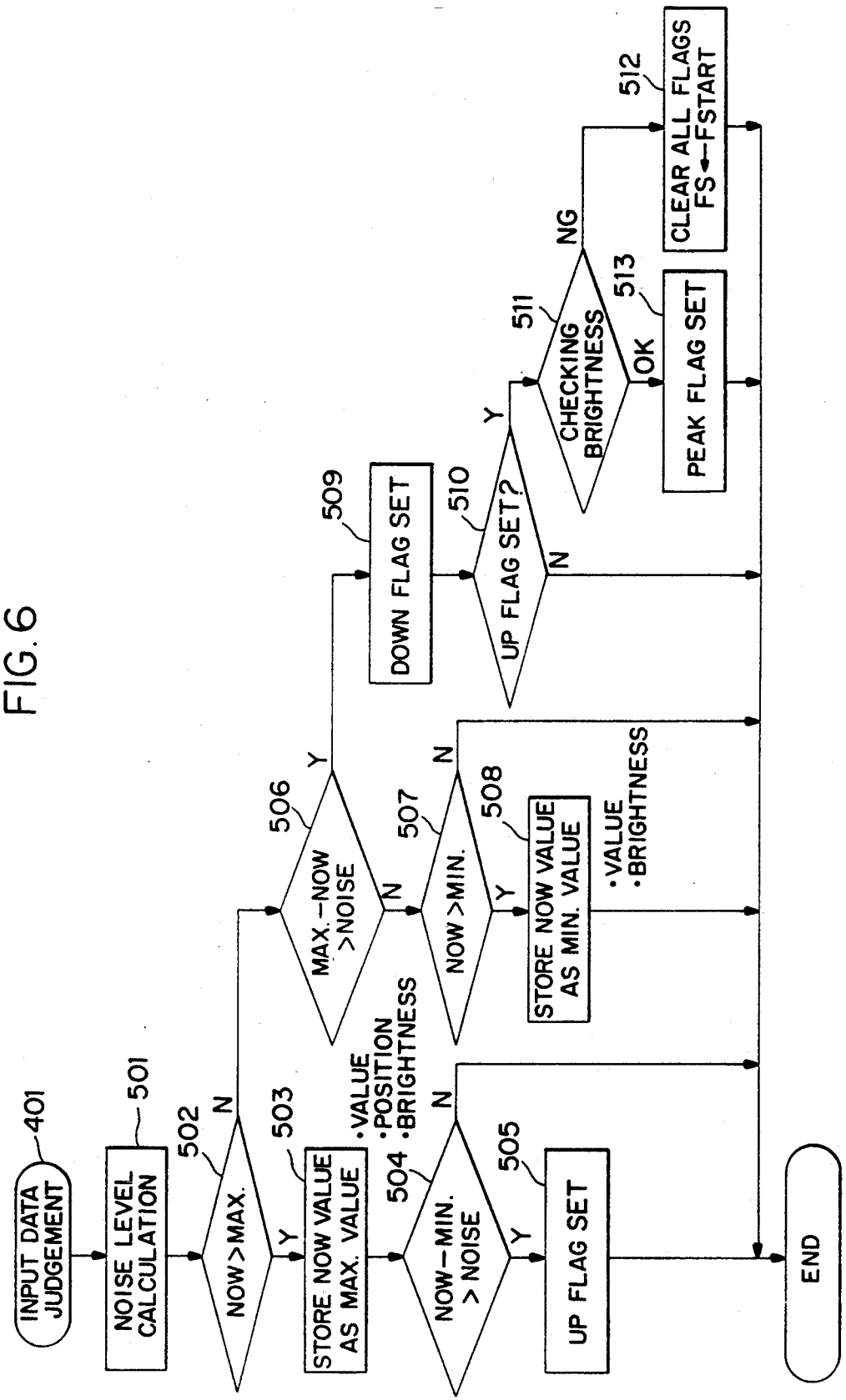
FIG. 6 is a flow chart of a routine for judging an input data.

In this case, the focus status information is SER1, operation goes to a step 307, in which the focus lens 2 is driven until a peak of the evaluative value is found. A process routine of the SER1 is described in detail in FIG. 5. In FIG. 5, a process of judging an input data is operated in a routine as shown in FIG. 6 in a step 401 in which it is judged whether the evaluative value is going up or down or comming peak. In the next step 402, it is judged whether the evaluative value is going down or not. If it is judged the evaluative value is going down, it is judged whether a peak was comming over or not before the evaluative value going down. If a peak is running over, a focus status data is rewritten to RETPEK in a step 404. Unless a peak is running over, it is judged that an operation was wrong and the focus status is rewritten to SER2. In the case that the evaluative value is not going down in the previous step 402, it is judged whether the focus lens 2 is approached to an end point or not in a step 406. If it is judged that the focus lens 2 was approached to the end point, it is recognized that the operation is wrong and the focus statius is rewritten to MOVVL in a step 407.

In the next, a process routine for judging input data (step 401) will be described with reference to FIG. 6. A noise level is calculated in a step 501. A noise component is included in an evaluative value. Unless a displacement of the evaluative value is greater than the noise level, it cannot judge whether the evaluative value is going down or up. Therefore, it is necessary to know the noise level. Further, the noise level is influenced by an iris value, a gain value of the AGC circuit 5 or a gain value of the amplifier 6. The noise level is calculated based on the above factors. If a noise level is adjusted in the case that an UP flag exists or not, it is preferable to judge input data. Therefore, the noise level is calculated depending on an existence of the UP flag. FIGS. 16A through 16D show some examples of functional relation for calculating the noise level.

After calculating the noise level, it is judged whether a present evaluative value is greater than the last highest value in the next step 502. If the present evaluative value is greater than the last highest value, the present evaluative value is renewed as the new highest value and stored in a register in a step 503. At that time, the position of the focus lens 2 and a brightness of an auto exposure system are simultaneously memorized. In the next step 504, it is judged whether a difference between the present evaluative value and the last lowest value is greater than a noise level N1. If the difference is greater than the noise level N1, it means that the evaluative value is increasing and then the UP flag is set in a step 505.

In the case that the present evaluative value is less than the last highest value in the step 502, it is judged whether a difference between the last highest value and the present evaluative value is greater than the noise level N1 in a step 506. If the difference is less than the noise level N1, it is judged whether the present evaluative value is less than the last lowest value in the next step 507 and then the present evaluation value is renewed as the new lowest value and stored in a register in the next step 508. A brightness of the auto exposure system at the time is also memorized.

In the case that the difference between the highest value and the present evaluative value is greater than N1, it means that the evaluative value is going down. In a step 509, a DOWN flag is set. In the next step 510, it is judged whether the UP flag is already set or not. If the UP flag is already set, it is recognized that a peak of the evaluative value has existed. However, the peak of the evaluative valie is also occured if a brightness of an object is changed during an operation. To avoid such wrong judegment, a brightness of the object at a peak time is detected at a step 511. A brightness of the auto focus exposure system at a moment when an evaluative value becomes the maximum value is much greater than a value at a moment when the evaluative value becomes the minimum value, for example, a ratio thereof is equal or more than 120%, the UP flag and the DOWN flag are cleared and the focus status data is rewritten to FSTART. If the ratio is no so high, it is recognized that the peak of the evaluative value has existed and a peak flag is set in a step 513.

It will be explained a brightness of the auto exposure system. The micro computor 14 calculates a brightness of an object based on an opening degree of the iris 3 and a gain value of the AGC circuit 5. That is, the higher the brightness of an object becomes, the more the iris 3 is closed. The lower the brightness of an object becomes, the more the iris 3 is opened. If the iris 3 is released and then the brightness of an object becomes dark, the gain of the AGC circuit 5 becomes higher. When an electric shutter is actuated, an opening degree of the iris 3 is more increased and a gain of the AGC circuit 5 becomes higher, while a shutter speed becomes more faster. A brightness of an object can be calculated by considering these information by the computor 14.

In the case that the focus status information is SER2, a motor for driving the focus lens 2 is reversely driven in the step 308 as shown in FIG. 4. The focus status data is rewritten in the next step 309. As shown in FIG. 5, the steps 401, 402, 403 and 405 are operated in order along a flow chart of a SER1 process routine. If a peak of the evaluative value cannot be found, it is necessary to reversely drive the focus lens 2 in order to find the peak of the evaluative value in the SER1 process routine.

In the case that the focus status data is MOVVL, the situation is similar to SER2. That is, the motor for driving the focus lens 2 is reversely driven in the step 310 as shown in FIG. 4. The focus status is rewritten to SER1 in the next step 311. As shown in FIG. 5, the steps 401, 402, 406 and 407 are operated in order along the flow chart. The focus lens 2 is approached at the end point while the evaluative value is not going down so that it is necessary to reversely drive the focus lens 2 in order to find a peak of the evaluative value in the SER1 routine.

In the case that the focus status becomes RETPEK by finding the peak at the step 403 in FIG. 5, the focus lens 2 is returned to a position where the evaluative value becomes maximum in the step 312 in FIG. 4, the focus status FS is rewritten to REKRCG in the next step 313 and it is checked to actuate the motor for driving the focus lens 2 again at the step 318. If the step 319 judges that it is necessary to actuate the motor again (it will be described later), the focus status data is rewritten to FSTART at a step 320.

Figure 7:
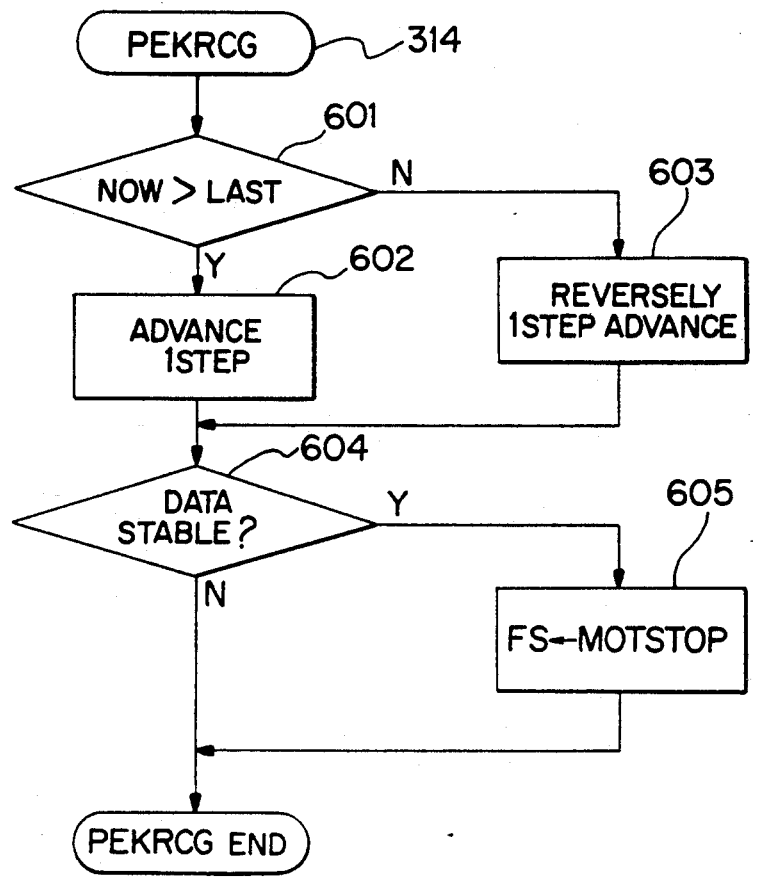
FIG. 7 is a flow chart of PEKRCG routine for confirming a peak of an evaluative value.

In the case that a focus status data is PEKRCG, an output of the narrow band pass filter 8 is selected by controlling the switch 9 in a step 314 in FIG. 4 in order to confirm the peak of the evaluative value. The PEKRCG routine is shown in FIG. 7 in detail. Initially, the present evaluative value is compared with the previous value in a step 601. If the present value is greater than the previous value, a position of the focus lens 2 is advanced one step at a step 602. If the previous value is greater than the present value, the position of the focus lens 2 is oppositely advanced one step in a step 603. In a step 604, it is judged whether the data become stable or not by judging whether the evaluative value corresponding to position of the focus lens 2 advanced forwardly/backwardly some steps is within a specified noise level ($-N2/+N2$). If the data is stable in a predetermined period, it is recognized that the focus lens 2 is located at a point where the evaluative value becomes the peak and the focus status data FS is rewritten to MOTSTOP in a step 605.

After finishing the PEKRCG process, it is judged whether a confirmation of the peak of the evaluative value is finished or not at a step 315 in FIG. 4. If the confirmation is finished, the focus status FS is rewritten to MOTSTOP in a step 316 and then an operation goes to a step 318 for checking the actuation of the motor again in a step 318. Unless the confirmation is finished, the operation goes to a step directly for checking the actuation of the motor again.

In the case that the focus status is MOTSTOP, a motion of the focus lens 2 is stopped by stopping the motor and then the operation goes to the step 318.

Figure 17:
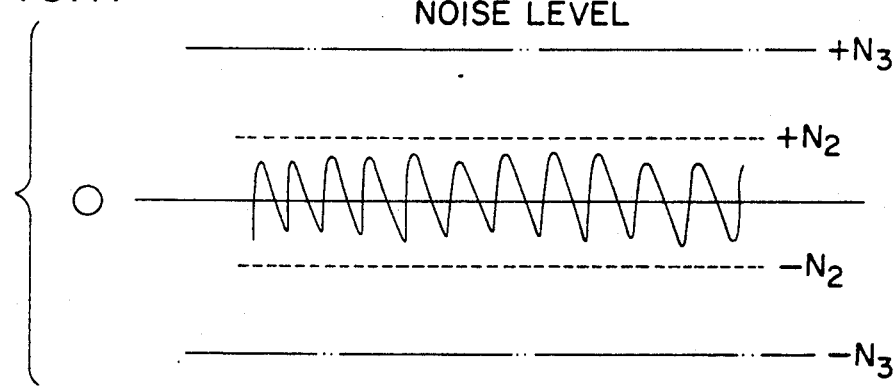
FIG. 17 shows some kinds of a noise level.

In the step 318 for checking an actuation of the motor again, the following process is operated. It is judged whether the evaluative value at a focus position is changed more than a predetermined level ($-N3/+N3$). If the displace amount is more than the level $-N3/+N3$, it is judged that focusing is not proper and it is concluded to repeat an auto focus process from the first at a step 319 and the focus status FS is rewritten to FSTART. As shown in FIG. 17, it is set that N3 is greater than N2.

Figure 8:
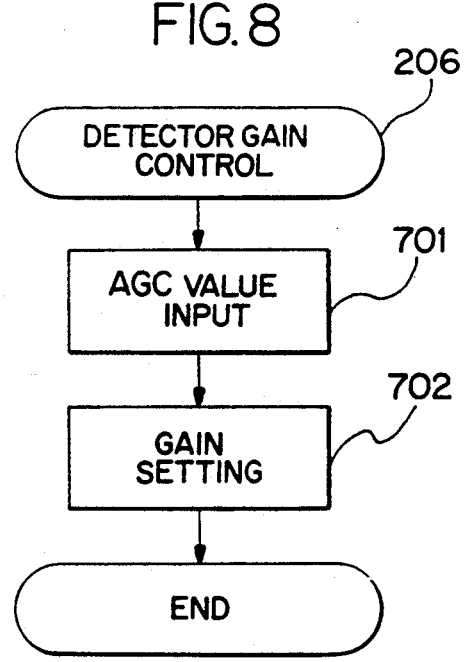
FIG. 8 is a flow chart of a processing routine for controlling a gain of an amplifier circuit.
Figure 18:
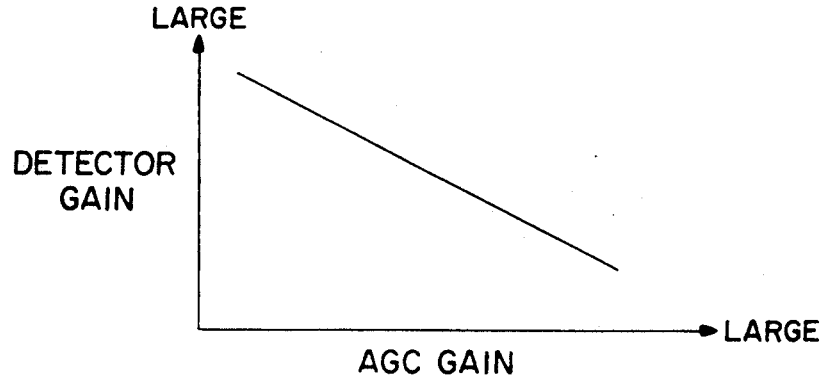
FIG. 18 shows a characteristic of a gain of an amplifier.

In the next, it will be described a process routine for controlling a gain value of the wave detector 10 with reference to FIGS. 8 and 18. A gain value of the AGC 5 is input at a step 701. Corresponding to the gain value, a gain value of the amplifier 6 is determined from a relation, for example, as shown in FIG. 18 for reducing a noise in a whole system when the gain value of the AGC 5 is relatively high in a step 702.

Figure 9:
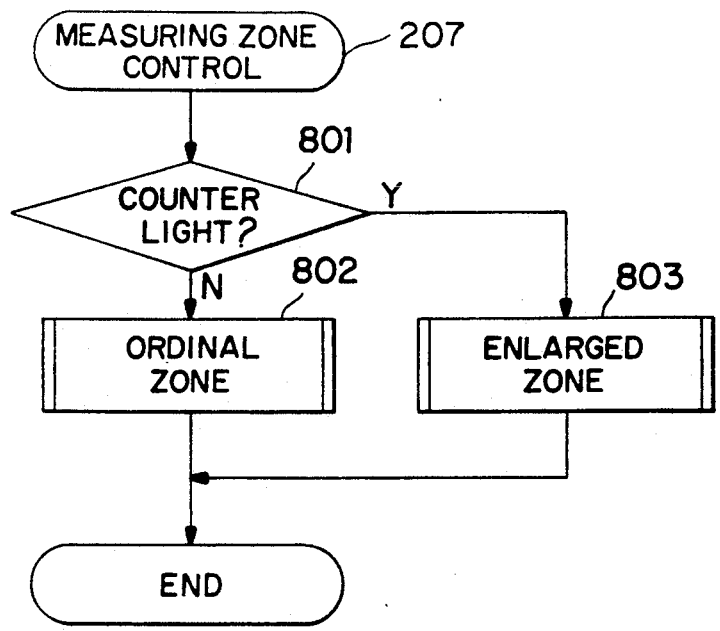
FIG. 9 is a flow chart of a processing routine for controlling a zone for measuring a distance.
Figure 10A:
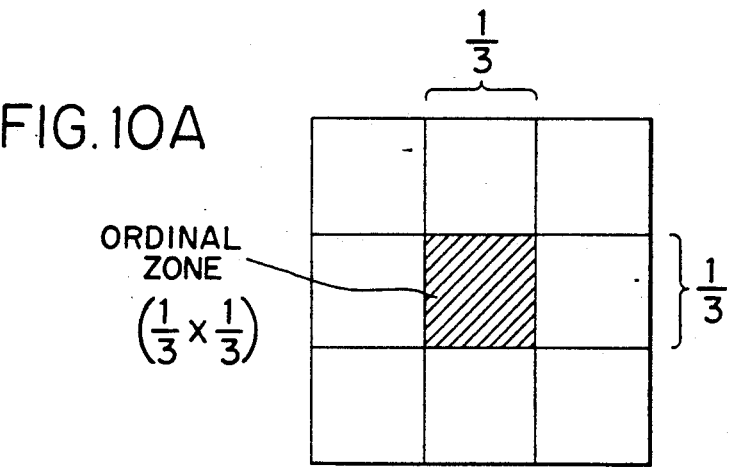
FIGS. 10A and 10B show one example of a zone for measuring distance.
Figure 10B:
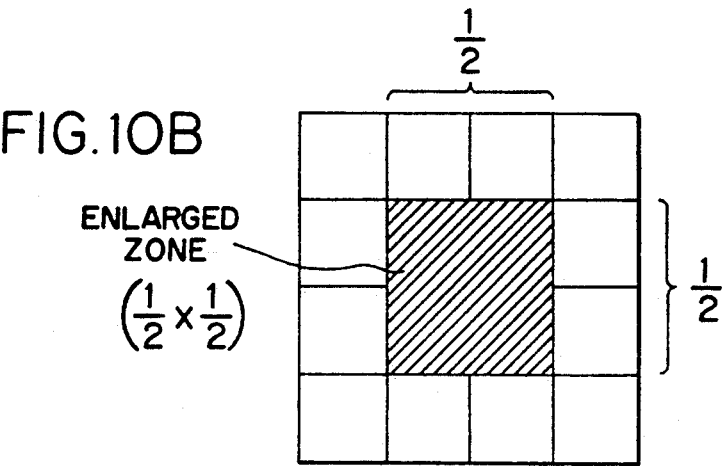

It will be described a process for controlling a zone for measuring a distance in a step 207 in FIG. 3 with reference to FIGS. 9 and 10. A srep 801 in FIG. 9 judges whether it is a counter light or not from an information of an auto exposure system. If it is not the counter light, an ordinary zone for measuring a distance having ⅓ length and ⅓ width of a picture plane is provided at a center portion as shown in FIG. 10A in a step 802 and a focus process is operated based on a signal from the zone. If it is a counter light, an enlarged zone for measuring a distance having ½ length and ½ width of a picture plane is provided at a center portion as shown in FIG. 10B.

Figure 11:
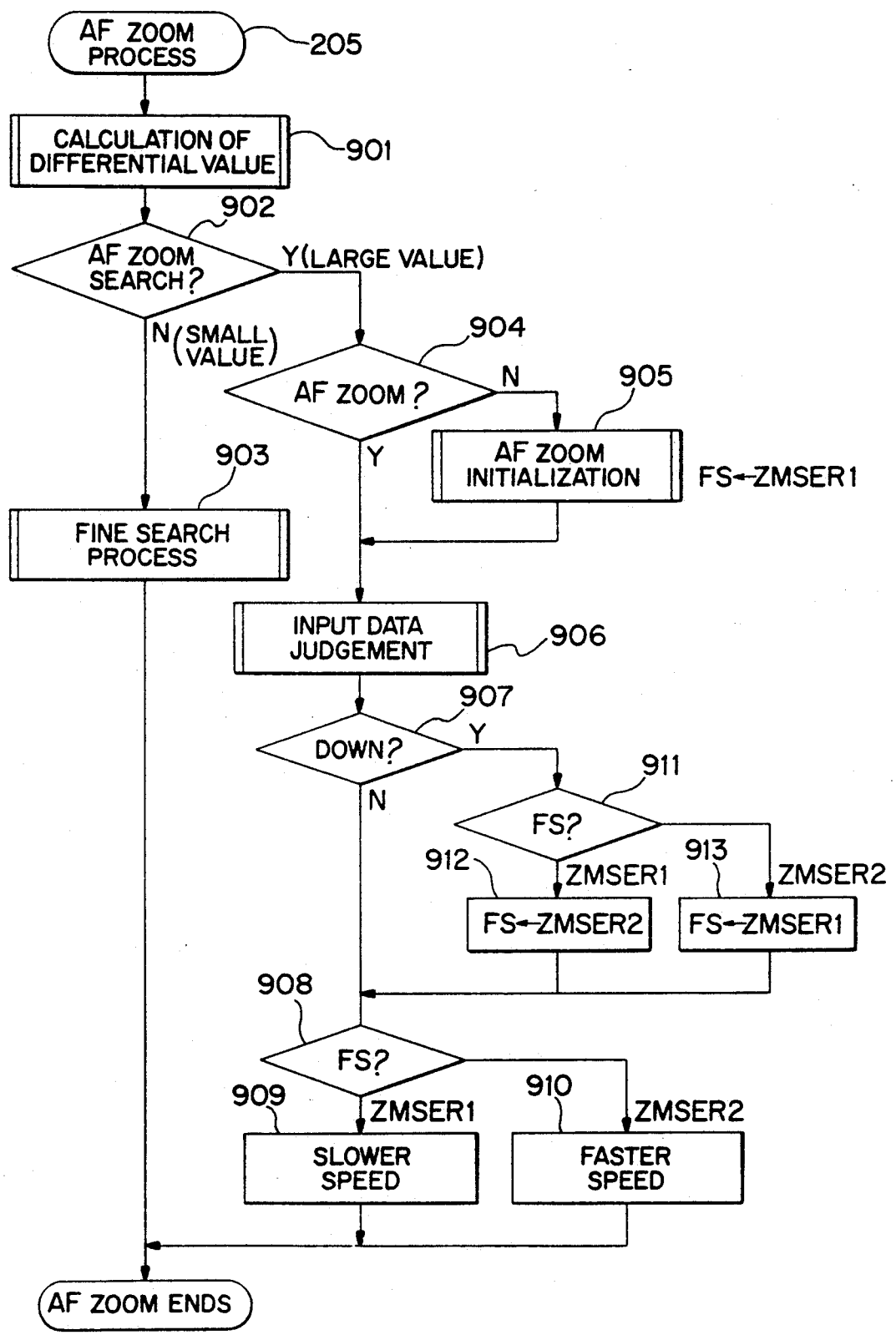
FIG. 11 shows a flow chart of an auto focus zoom processing routine.
Figure 12:
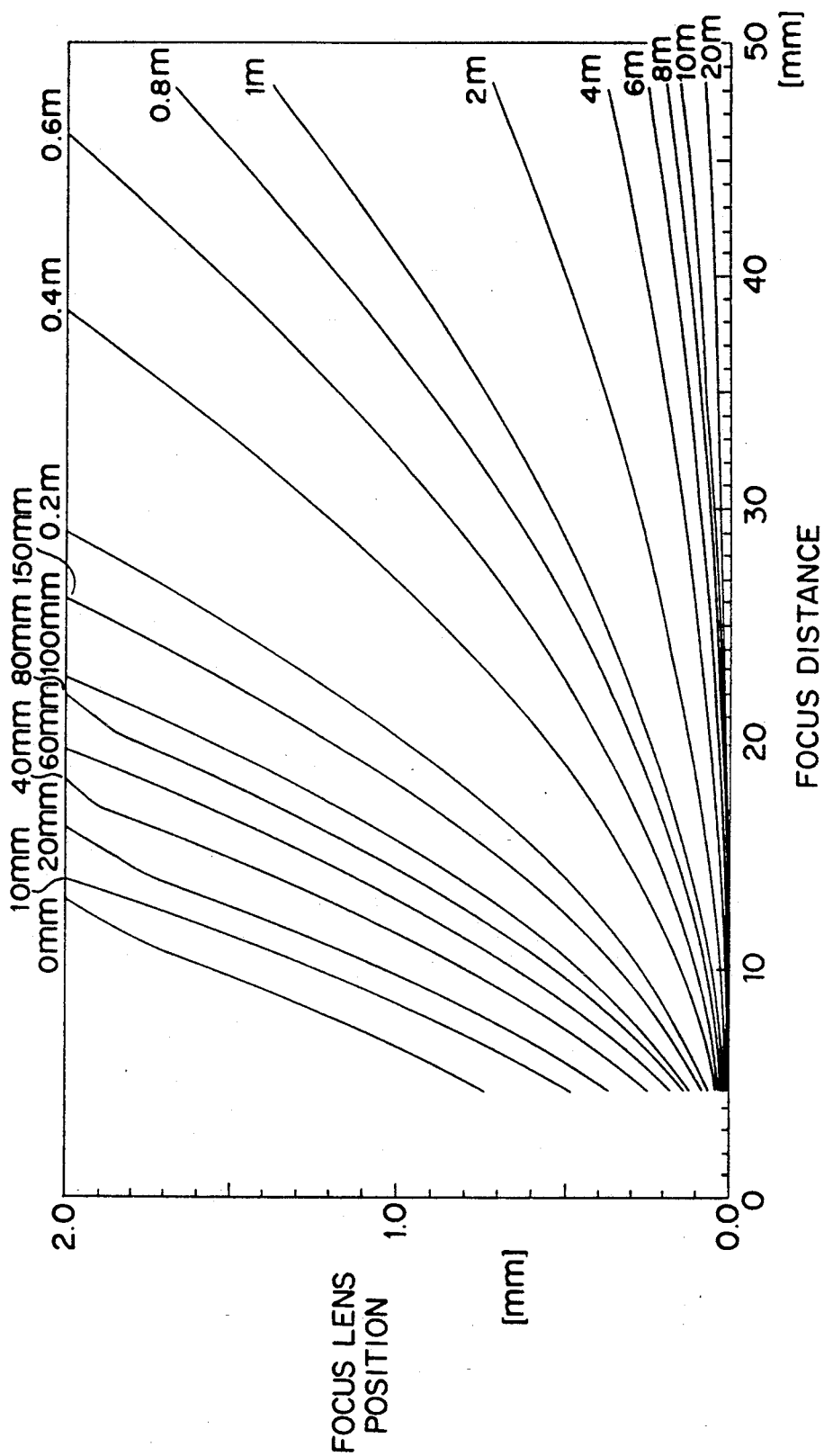
FIG. 12 shows a relation between a focus distance and a focus position of a focus lens.
Figure 13:
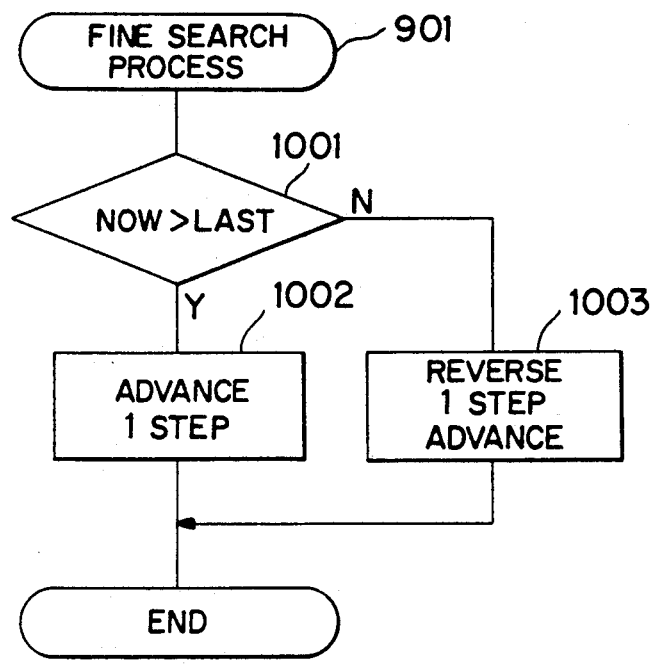
FIG. 13 shows a flow chart of a process routine for fine adjustment search.

It will be an auto focus zoom process in a step 205 as shown in FIG. 3 with reference to FIGS. 11 through 13. The focus is matching at a step 211, a differential value of an auto focus zoom trucking is calculated at a step 901 in FIG. 11. In the auto focus zoom process, as shown in FIG. 12, a relation between the focus distance of the zooming lens 1 and a position of the focus lens 2 is previously known with a distance between a camera and an object as a parameter. It is necessary to displace a position of the focus lens 2 along a parameter characteristic curve corresponding to a movement of the zooming lens 1 by memorizing a function or a table of the relation. It had better to switch a control of a position of the focus lens in accordance with a displacement of a position of the focus lens with respect to a change of a focus distance, that is an amount of the differential valu e. It may detect a differental value from its characteristic line as shown in FIG. 12 every time. However a differential line most matches an original characteristic line in a rear focus optical system according to the present invention, that is, the original characteristic line is an exponential function so that differential value is obtained by multiplying a value of a position of the focus lens by a coefficient corresponding to a parameter of a distance between an object and the camera.

In the next step 902, it is judged whether the differential value is greater than the predetermined value. If the differential value is less than the predetermined value, a process of a fine adjustment search is operated in the next step 903. In the process for a fine adjustment search, as shown in FIG. 13, a position of the focus lens is advanced one step. Initially, the evaluative value at present focusing time is compared with the previous evaluative value in step 1001. If the present evaluative value is greater than the previous value, the position of the focus lens is further advanced one step along the same direction in a step 1002. If the present value is less than the previous value, the position of the focus lens is advanced one step along the opposite direction in a step 1003.

On the other hand, in the case that the differential value is greater in the step 902 as shown in FIG. 11, it is judged whether it was an auto focus zooming process at the previous time in a step 905. If it was not the auto focus zooming process, the auto focus zooming process is initialized at a step 905. After the focus status FS is written as ZMSER1, the operation goes to a step 906.

The step 906 is a process judging input data. It is a similar content of the step 401 in a process of SER1 in FIG. 5 so that it is operated the same process for judging input data described in FIG. 6. It is judged whether the evaluative value at a focusing position is going up or down from a result of the process for judging the input data in a step 907. Unless the evaluatuve value is going down, it is judged whether a focus status data is ZMSER1 or ZMSER2 in a step 908. If the focus status is ZMSER1 in the step 908, a position of the focus lens 2 is moved with a speed slower than the differential value at a step 909. If the focus status is ZMSER2, a position of the focus lens 2 is moved with a speed faster than the differential value at a step 910. However, in the case that the evaluative value is judged going down at the step 907, a focus status is judged at a step 911. If the focus status is ZMSER1, the focus status is rewritten to ZMSER 2. If the focus status is ZMSER2, the status is rewritten to ZMSER1 at a step 913. And the operation goes to a step 908 and the position of the focus lens is moved in the step 909 or the step 910.

Figure 14:
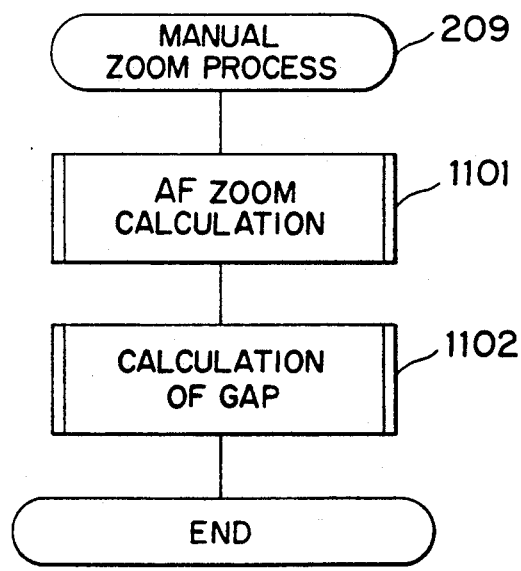
FIG. 14 shows a flow chart of a manual zoom process routine.
Figure 15:
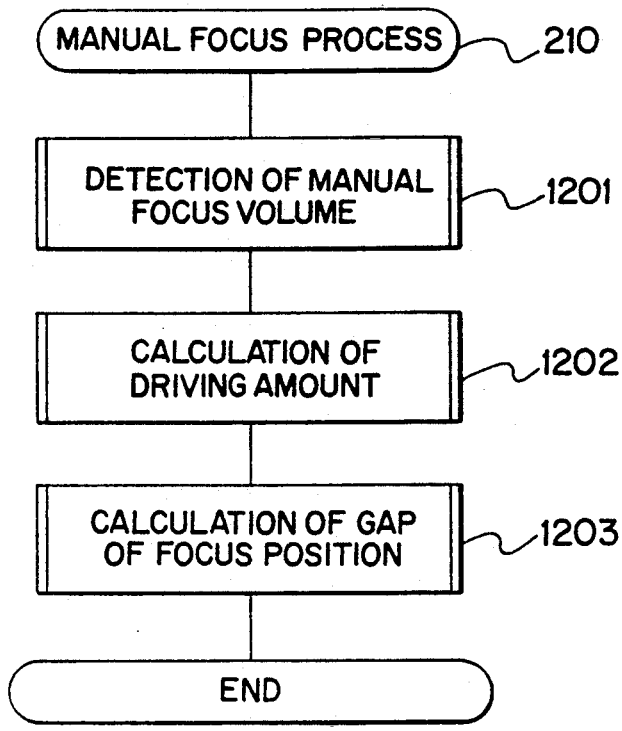
FIG. 15 shows a flow chart of a manual focus process routine.
Figure 16A:
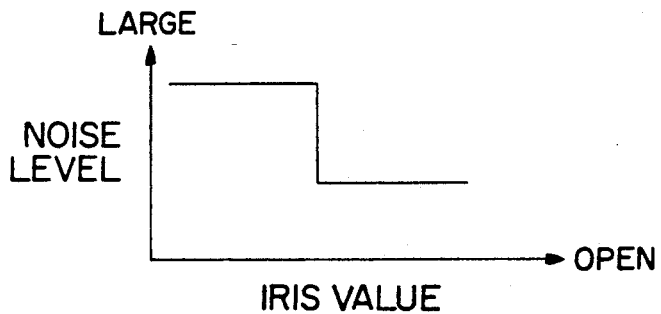
FIGS. 16A through 16D show a functional relation between a noise level and the other parameters, respectively.
Figure 16B:
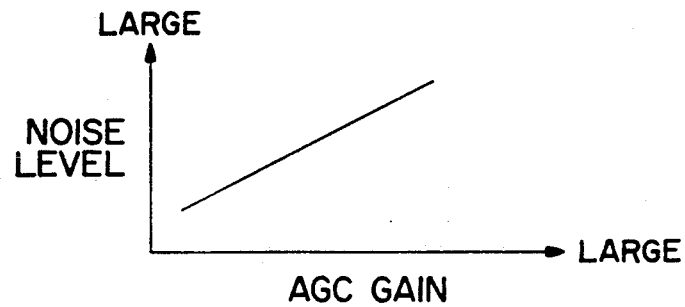
Figure 16C:
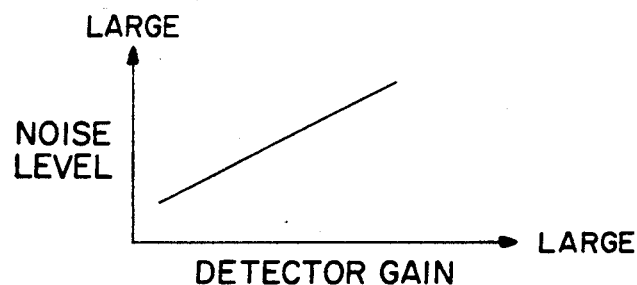
Figure 16D:
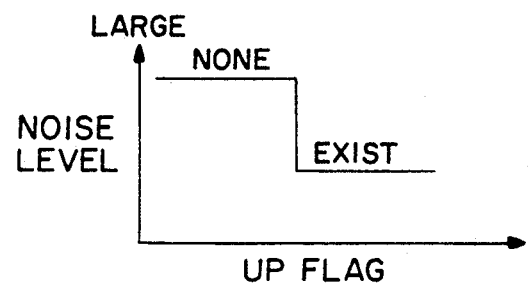

In the next, a manual zoom process in a step 209 and a manual focus process in a step 210 in FIG. 3 will be described with respect to FIGS. 14 and 15. As shown in FIG. 14, it is calculated an auto focus zoom trucking at a step 1101 initially at the manual zoom process as shown in FIG. 14. A position of the focus lens corresponding to the zoom positon is calculated in accordance with a relation between a focus distance and a position of the focus lens with a distance between an object and the camera as a parameter as shown in FIG. 12. A gap between an actual position of the focus lens and a calculated position of the focus lens is calculated. On the other hand, as shown in FIG. 15, in a manual focus process, an operation amount of a manual focus volume 18 is detected at a step 1201 initially. A driving amount of the focus lens corresponding to the operation amount is calculated at a step 1202. At the step 1203, a focus lens 2 is moved corresponding to the gap of the position of the focus lens calculated in the step 1102 for the manual zoom process and the driving amount of the position of the focus lens calculated in the step 1202 for a manual focus process.

As described above, in accordance to the present invention, a broad band pass filter and a narrow band pass filter can be switchable. The broad band pass filter is utilizes for detecting a moving direction of a focus lens and a peak of an evaluative value so that the judgement of the moving direction is determined correctly and a detection of the peak can be found rapidly. The narrow band pass filter is utilized for detecting a real peak of the evaluative value so that the peak can be found correctly.

In accordance with the present invention, a brightness of an object at a moment when an evaluative value becomes peak and a brightness of an object at the other moment are compared. If the brightness of an object at a moment when an evaluative value becomes peak is changed very much, such a peak is not recognized as a real peak. Therefore, a judgement of a peak of a evaluative value is not influenced by a brightness of an object so that the judgement is operated correctly.

In accordance with the present invention, a reference value for judging a displacement of an evaluative value can be changed corresponding to an degree of an iris, a gain value of an AGC circuit, or a gain value of a wave detector circuit, so that a over run of a focus lens can be reduced in a period for detecting a peak of an evaluative value and it is prevent from wrong judging a detected peak.

I claim:

1. An auto focus control device comprising;
   a band pass filter means for filtering a high frequency part of a signal of a picture image from a photographing means,
   a means for detecting an evaluative value for focusing from a filtered signal,
   a means for determining a position of a focus lens in order to make said evaluative value maximum at said position,
   said band pass filter means comprising a broad band pass filter and a narrow band pass filter,
   wherein a moving direction of said focus lens and a peak of said evaluative value are judged and detected based on an output of said broad band pass filter, said band pass filter means is switched to said narrow band pass filter and said peak of said evaluative value is confirmed based on an output of said narrow band pass filter.

2. An auto focus control device as claimed in claim 1 further comprising;
   a means for confirming said peak of said evaluative value in case that said evaluative value is stable in a predetermined time while said focus lens is moved frontwards and backwards.

3. An auto focus control device claimed in claim 1 comprising;
   a means for detecting an evaluative value for focusing by detecting a high frequency part of a signal of a picture image,
   a means for positioning a focus lens at a point where said evaluative value peaks,
   a means for detecting a brightness of an object,
   a means for comparing a brightness of an object at a moment when said evaluative value peaks and a brightness of said object at another moment, and
   a means for judging a detected peak of said evaluative value as valuable in a case that a displacement of a brightness is within a predetermined level and as invaluable in a case that said displacement of said brightness is not within said predetermined level.

4. An auto focus control device claimed in claim 1 comprising;
   an automatic gain control circuit for inputting a signal of an image picture of an object from a photographing means,
   a means for detecting an evaluative value for focusing by detecting a high frequency part of an output signal from said automatic gain control circuit,
   a means for positioning a focus lens at a point where said evaluative value peaks,
   a wave detecting means for detecting said high frequency part in accordance with a gain value of said automatic gain control circuit, and
   a means for reducing a gain value of said wave detecting means.

5. An auto focus control device claimed in claim 1 comprising;
   a means for detecting an evaluative value for focusing by detecting a high frequency part of a signal of a picture image,
   a means for positioning a focus lens at a point where said evaluative value peaks,
   a means for varying a reference value depending on an opening degree of an iris, wherein a displacement of said evaluative value is judged valuable or invaluable based on said reference value.

6. An auto focus control device claimed in claim 1 comprising;
   an automatic gain control circuit for inputing a signal of an image picture of an object from a photographing means,
   a means for detecting an evaluative value for focusing by detecting a high frequency part of an output of said automatic gain control circuit,
   a means for positioning a focus lens at a point where said evaluative value peaks,
   a means for varying a reference value depending on a gain value of said automatic gain control circuit, wherein a displacement of said evaluative value is judged valuable or invaluable based on said reference value.

7. An auto focus control device claimed in claim 1 comprising;
   a means for picking up a high frequency part of a signal of an image of an object from a photographing means,
   a wave detecting means for detecting said high frequency part,
   a means for detecting an evaluative value for focusing by said wave detecting means,
   a means for positioning a focus lens at a point where said evaluative value peaks, and
   a means for varying a reference value depending on a gain valueof said wave detecting means, wherein a displacement of said evaluative value is judged valuable or invaluable based on said reference value.

* * * * *